United States Patent
Ellis et al.

(10) Patent No.: US 11,188,489 B2
(45) Date of Patent: Nov. 30, 2021

(54) USB CONNECTIONS

(71) Applicant: DISPLAYLINK (UK) LIMITED, Cambridge (GB)

(72) Inventors: Daniel Ellis, Cambridge (GB); Peter Burgers, Cambridge (GB); Richard Jonathan Petrie, Guildford (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/270,554

(22) Filed: Feb. 7, 2019

(65) Prior Publication Data

US 2019/0171600 A1   Jun. 6, 2019

Related U.S. Application Data

(63) Continuation of application No. 15/561,963, filed as application No. PCT/GB2016/050801 on Mar. 22, 2016, now Pat. No. 10,248,599.

(30) Foreign Application Priority Data

Mar. 27, 2015   (GB) ..................................... 1505352

(51) Int. Cl.
  *G06F 13/38*   (2006.01)
  *G06F 5/06*    (2006.01)
  *G06F 13/42*   (2006.01)

(52) U.S. Cl.
  CPC ............ *G06F 13/385* (2013.01); *G06F 5/065* (2013.01); *G06F 13/4282* (2013.01); *G06F 2213/0042* (2013.01); *Y02D 10/00* (2018.01)

(58) Field of Classification Search
  USPC .................................................. 710/38, 313
  See application file for complete search history.

(56) References Cited

U.S. PATENT DOCUMENTS 6,622,194 B1    9/2003  Lee
2009/0327536 A1*  12/2009  Solomon ............... G06F 13/426
                                                    710/63

(Continued)

FOREIGN PATENT DOCUMENTS

GB    2473123 A    3/2011
WO    2005072335 A2    8/2005

(Continued)

OTHER PUBLICATIONS

Search Report for Application No. GB1505352.3 dated Aug. 25, 2015. pp. 1-3.

(Continued)

*Primary Examiner* — Ilwoo Park
(74) *Attorney, Agent, or Firm* — Paradice & Li LLP

(57) ABSTRACT

A method of configuring a Universal Serial Bus (USB) connection between a first and second devices, the USB connection comprising a plurality of data channels, each having a pair of signal links, each signal link including a port at either end of the connection, and a signal wire formed of one or more physical wires extending between corresponding ports. Each of the signal links are configured with a first direction for transmission of data. The first direction is determined based on an initial required data transmission capacity in each direction between the first and second devices. Thereafter, depending on required capacity in the different directions, a selection is made which of the signal links should change their direction of transmission from the first direction to a second direction and a redirection signal is sent to each of the selected signal links to cause the change in direction of transmission.

14 Claims, 4 Drawing Sheets

(56) References Cited

U.S. PATENT DOCUMENTS

| | | | |
|---|---|---|---|
| 2010/0142418 A1* | 6/2010 | Nishioka | H04L 5/1438 370/282 |
| 2012/0324146 A1 | 12/2012 | Marks et al. | |
| 2013/0080665 A1 | 3/2013 | Park et al. | |
| 2014/0101357 A1* | 4/2014 | Stolitzka | G06F 13/4295 710/316 |
| 2014/0126421 A1* | 5/2014 | Lida | H04L 41/12 370/254 |
| 2016/0217103 A1* | 7/2016 | Kim | G06F 13/4282 |
| 2018/0184037 A1* | 6/2018 | Toba | H04L 5/16 |

FOREIGN PATENT DOCUMENTS

| | | | |
|---|---|---|---|
| WO | 2010002660 A2 | 1/2010 | |
| WO | 2013048508 A1 | 4/2013 | |

OTHER PUBLICATIONS

International Search Report and Written Opinion issued by the International Searching Authority dated May 27, 2016 for PCT Application No. PCT/GB2016/050801. pp. 1-8.

* cited by examiner

USB CONNECTIONS

RELATED APPLICATIONS

This application is a continuation of U.S. patent application Ser. No. 15/561,963, which was filed on Sep. 26, 2017, which is a National Stage Patent Application of International Patent Application No. PCT/GB2016/050801, filed on Mar. 22, 2016, and claims priority to Great Britain Patent Application No. 1505352.3 entitled "USB Connections," which was filed on Mar. 27, 2015, each of which are hereby incorporated by reference in their entirety.

TECHNICAL FIELD

The present invention relates to methods for configuring a USB connection that can be used for carrying generic data between two devices to make it more flexible depending on the data being carried.

BACKGROUND

In desktop computing, it is now common to connect external peripherals such as mice, keyboards or display devices to a computing device such as a standard desktop computer, a laptop or even a mobile device such as a smartphone or tablet computer. A computing device which is supplying data to or controlling a peripheral is commonly known as a host. A host such as a standard desktop computer will, in general, be provided with specific output ports for each variety of output data. For example, it may have a single VGA port for video data. The connection of additional peripherals for which there are no specific ports is difficult, as it would generally require the user to install additional ports or internal devices such as additional hard drives or graphics cards. Solutions along these lines are relatively expensive and may be difficult for less-technical users.

An alternative method of connecting an external peripheral is to connect each peripheral to a USB socket on the host, as all modern computers are provided with multiple USB sockets. This provides a simple connection topology, but requires additional hardware and software to be present, as in general, USB has a low bandwidth that makes the provision of good-quality video output or fast data transfer, for example, a non-trivial task.

A USB cable commonly comprises one or more pairs of signal links, a pair being known as a data channel, where one of the links carries data in one direction and the other link carries data in the other direction, i.e. there is an upstream and a downstream link for each channel. The USB cable, when connected to a USB connector at each end, forms part of a USB connection, together with a USB controller at each of the devices at each end of the USB cable. Nevertheless, if data only needs to be transmitted primarily in one direction, for example where the connection is from a user input device such as a microphone, there will be no data input to the microphone and therefore only half of the USB connection's limited bandwidth will be in use. This results in wasted resources.

The invention seeks to address at least part of the above-described problem.

SUMMARY

According to a first aspect of the invention, there is provided a method of configuring a Universal Serial Bus, USB, connection between a first device and a second device, the USB connection comprising a plurality of data channels, each data channel comprising a pair of signal links, each signal link comprising a port in the device at either end of the connection, a controller in each of the first and second devices coupled to control the connection at each port, and a signal wire extending between corresponding ports, each signal wire comprising one or more physical wires, the method comprising:
  configuring both of the signal links of at least one of the data channels to be capable of transmitting data bidirectionally;
  initially determining a first direction for transmission of data for each of the bidirectionally configured signal links based on an initial required data transmission capacity in each direction between the first and second devices;
  transmitting data along each of the bidirectionally configured signal links in the determined first direction;
  selecting which of the bidirectionally configured signal links that are transmitting data in the first direction should change their direction of transmission to a second direction;
  sending a redirection signal to each of the selected bidirectionally configured signal links to cause the selected bidirectionally configured signal links to change their direction of transmission of data to a second direction; and
  transmitting data along each of the selected bidirectionally configured signal links in the second direction.

This method is beneficial because it allows signal links within a single USB cable to be used as efficiently as possible, according to the specific circumstances. For example, if an external hard disk is connected to a desktop computer and is being used to back up the computer, most of the data will be flowing from the computer to the external hard drive. Presently, only half the available bandwidth will be used. Using the method described above, all the signal links in the connection could be configured to transmit data from the computer to the external hard drive and, as a result, the data will be transmitted more quickly and efficiently.

Preferably, there are at least two high speed data channels and at least one low speed data channel, wherein the signal links of the high speed data channels are configured to be capable of transmitting data bidirectionally.

In one embodiment, the first direction initially determined for all of the bidirectionally configured signal links is the same, with one of the signal links of the slow speed data channel being used in the second direction.

The method may further comprise receiving a request signal requesting a particular data transmission capacity in a particular direction. Preferably, the request signal includes a request for a preferred number of signal links to be used for data transmission in the particular direction. In an embodiment, the request signal may include a request for a minimum number of signal links to be used for data transmission in the particular direction.

Selecting which of the bidirectionally configured signal links that are transmitting data in the first direction should change their direction of transmission to a second direction is preferably based on the request signal.

Selecting which of the bidirectionally configured signal links that are transmitting data in the first direction should change their direction of transmission to a second direction may be based on a priority of the data to be transmitted over the selected bidirectionally configured signal links and data to be transmitted over non-selected bidirectionally configured signal links. The priorities of the data to be transmitted over the selected bidirectionally configured signal links and the data to be transmitted over non-selected bidirectionally configured signal links preferably depend on priorities of processes using the data. In an embodiment, the priorities of the processes may be maintained in a look-up table.

Preferably, the first device comprises a host device and the second device comprises a peripheral device.

The first device and the second device preferably initially negotiating to determine which controller will perform the initial determining, selecting and sending steps.

The co-ordinating controller would preferably be selected as part of the connection of the devices, during the normal handshaking procedure. Preferably, it is the host or the device closest to the host (for example, a hub connected directly to the host), but other heuristics may be provided, for example:

the device with the most connection ports provided is automatically the co-ordinating device;

the device with the most processing power is automatically the co-ordinating device;

the device with the most available local memory is automatically the co-ordinating device in any combination or combined with other heuristics.

This feature is beneficial because it allows for better configuration of the links according to the needs of the two devices, which may vary and may be flexible. This would be most useful in a case where there was data moving both ways, for example to and from a touchscreen display. The maximum number of possible links could be provided for display data, while at the same time providing return lanes when necessary for the input data received through the touchscreen. In this example, the number of preferred and minimum lanes required by the touchscreen may be the same number, since user input has a high priority. However, in another example, such as where data is also being read from an external hard disk being used for a backup, the external hard disk might request a high preferred number of lanes but a low minimum number, since while it is important that the data is read quickly, it is not vital. If the backup is being performed by a higher-priority process then the read operation could be assigned a low number of lanes and transfer data more slowly than would be ideal.

The priorities of different processes could, for example, be stored in a lookup table in the driver application that controls access to the peripheral. Alternatively, the host could have a policy of always granting the preferred or minimum number of requested lanes, or a number of lanes equal to the average of the two requests, or these heuristics could be combined in any combination and with other appropriate heuristics, according to the natures of the host and peripheral and the specific circumstances of the connection.

According to a second aspect of the invention, there is provided a system comprising:

a host device having a Plurality of ports connected to a host controller;

a peripheral device having a plurality of ports connected to a peripheral controller; and a Universal Serial Bus, USB, cable between the host device and the peripheral device, the system providing a USB connection comprising a plurality of data channels, each data channel comprising a pair of signal links, each signal link comprising a port in the host device, a port at the peripheral device and a signal wire extending between corresponding ports, together with the host and peripheral controllers, each signal wire comprising one or more physical wires, wherein the USB connection is configured to perform a method as described above.

Some presently known active cables are capable of switching the direction of their links, but this requires special processing blocks to be provided within the cables, which must also be supplied with power. Embodiments of the present invention do not require any change to the cable and are therefore cheaper as there is no need for the user to replace his or her current cables and compatible cables do not require additional components. Furthermore, no power need be supplied to the cables, which increases power efficiency and possibly also safety as it means that there is less likely to be a current flowing over an unconnected cable.

BRIEF DESCRIPTION OF THE DRAWINGS

Embodiments of the invention will now be more fully described, by way of example, with reference to the drawings, of which.

DETAILED DESCRIPTION

Figure 1:
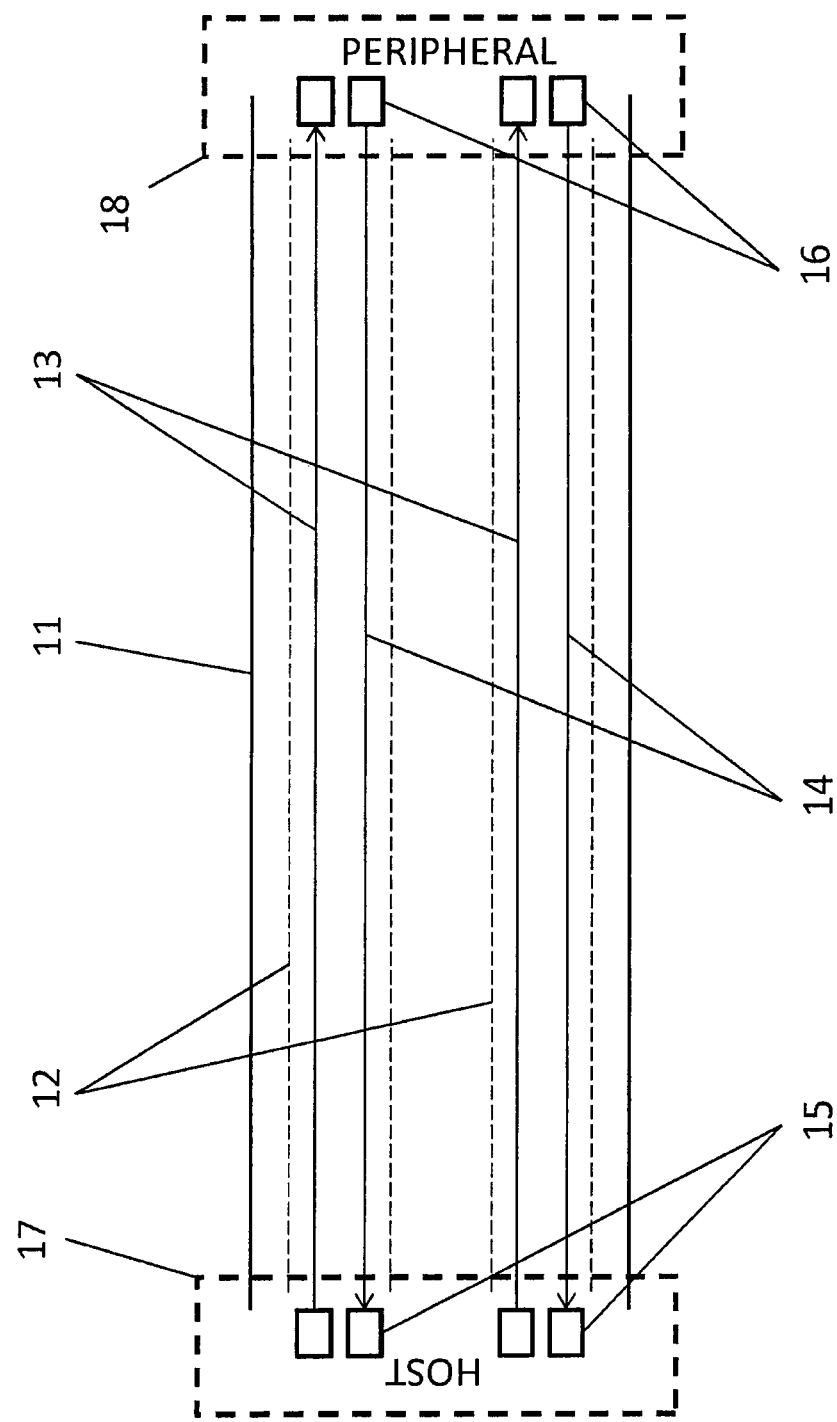
FIG. 1 is a schematic of a known USB cable connected between a host device and a peripheral device.

FIG. 1 shows a schematic of a known USB cable 11 connected between a host device 17 and a peripheral device 18. In this example there are two data channels 12, each of which contains a link 13 that transmits data from the host device 17 to the peripheral device 18 and a link 14 that transmits data from the peripheral device 18 to the host device 17. These links are used for data flow in their dedicated directions regardless of the amount of data flow and the needs of the two devices and this is enforced by the positions of transmitter 16 and receiver ports 15 (Tx and Rx respectively) in the devices. In a passive cable such as this, the host-peripheral links 13 will be connected to a Tx port 16 at the host device 17 and an Rx port 15 at the peripheral device 18 and the opposite will be true of the peripheral-host links 14. As a result, if, for example, the peripheral device 18 is a dumb display device, data will only be transmitted along the host-peripheral links 13 and the peripheral-host links 14 will not be used. This means that resources are wasted.

Figure 2:
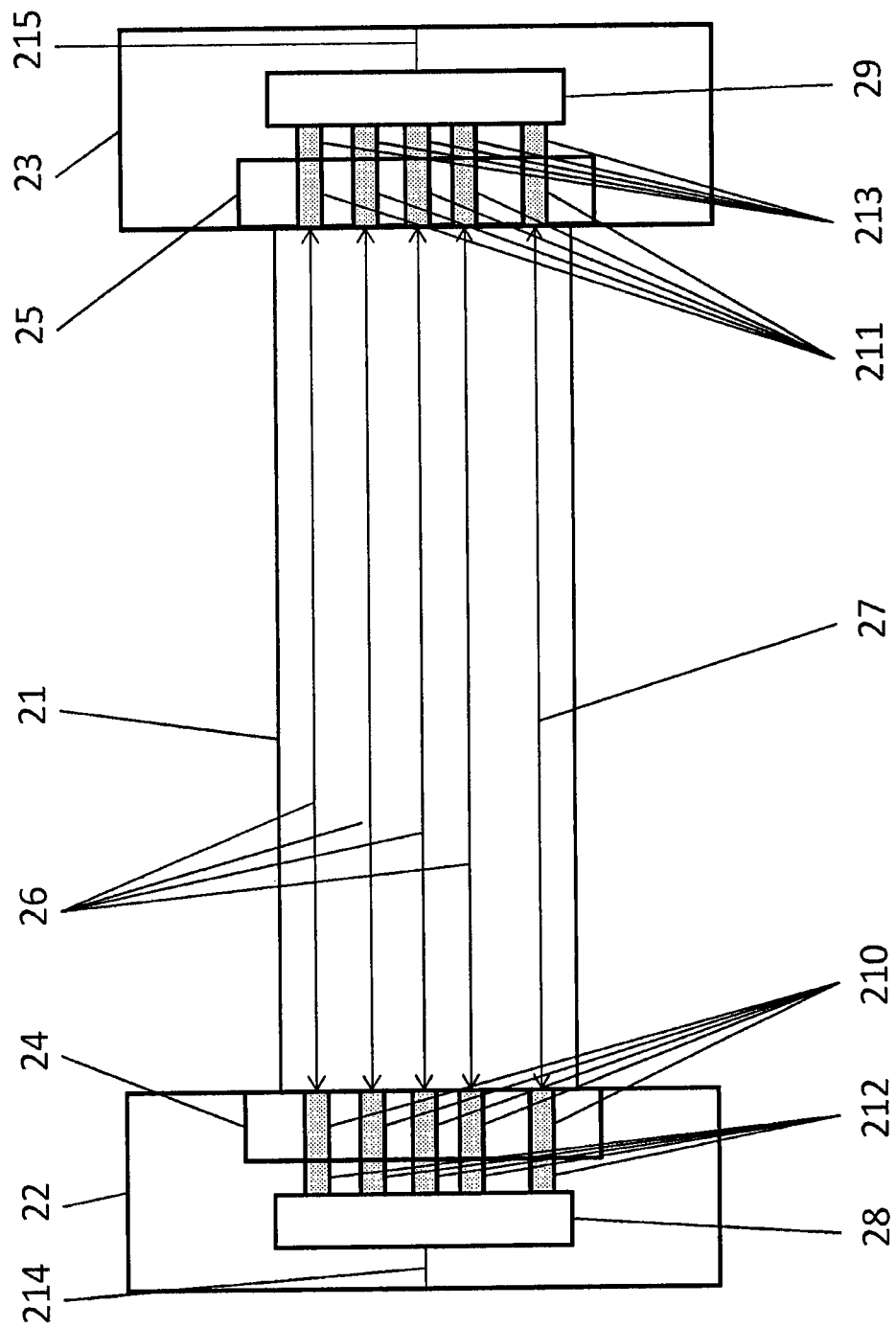
FIG. 2 is a schematic of a system with a USB connection according to an embodiment of the present invention.

FIG. 2 shows a schematic of a USB connection made up of a USB cable 21, host device 22 and peripheral device 23 configured in accordance with an embodiment of the present invention. The USB cable 21 comprises four high-speed signal links 26 and a slow signal link 27. At each end of the cable 21 is a plug 24 and 25, which are connected to the host device 22 or the peripheral device 23, respectively. The cable 21 could be physically arranged as a known passive cable, making the system backwardly-compatible so that no further processors or other hardware need be added to the cable 21. The embodiment shown only requires changes to the hardware and/or software of the host device 22 and the peripheral device 23.

For example, one known USB cable may contain two USB 3 super-speed data channels, such that each of the data channels contains two links. The cable may also include a single USB 2 channel, as is common for backwards-compatibility purposes. No physical changes would be necessary to such a cable in order to train the four super-speed links to operate according to one embodiment of the invention so that the four super-speed links would be able to work bi-directionally and the USB 2 channel could be used as a signalling link.

The host device 22 and the peripheral device 23 each contain socket controllers 28, 29 designed to control the use of the cable 21 and the directions of the links 26 as well as receiving and directing data to other components of the respective devices down an internal connection 214 and 215. The socket controllers 28 and 29 are also connected to connectors 212 and 213 in the sockets of their respective devices 22 and 23. When the plugs of cable 21 are plugged into the corresponding sockets of the devices, these connectors 212 and 213 come into contact with their complementary connectors 210 and 211 in the plugs at the ends of the cable 21. As a result, signals and data can be transmitted across them.

The cable 21 can be arranged to be functionally the same as the known cable described with respect to FIG. 1, with equal numbers of high-speed links 26 going in each direction. However, in a situation such as the connection between a host device and a display device described above, it would be possible, according to the present embodiment, to arrange the connections such that all four high-speed links carry display data from the host device 22 to the peripheral device 23. This would double the available bandwidth without increasing the number of links 26 in the cable 21.

Figure 3:
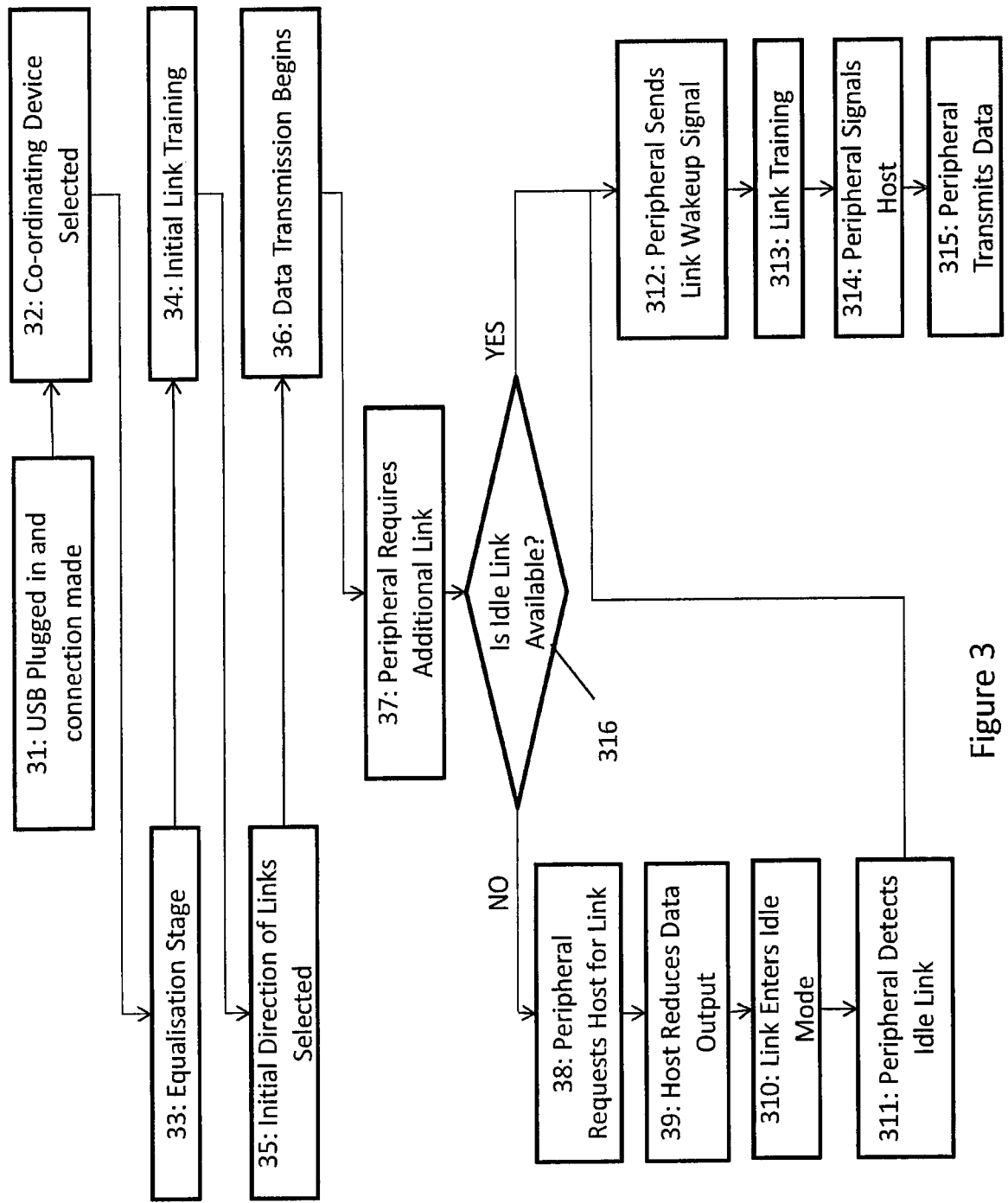
FIG. 3 is a flowchart showing a method of operation of the embodiment of FIG. 2.

FIG. 3 shows a process by which such a connection can be configured and used, with reference to the embodiment shown in FIG. 2.

At Step 31, the USB cable 21 is plugged into each device 22 and 23 in the conventional way and the internal 212 and 213 and external 210 and 211 connectors make contact, triggering a handshaking according to the USB protocol in the normal way.

In this case, however, as part of handshaking, at Step 32, the devices 22 and 23 negotiate which of them will act as the co-ordinating device. In this embodiment, the heuristic used is simply that the host device 22 will always act as the co-ordinating device, but other heuristics are possible.

At Step 33, the first stage of training begins. This is the Equalisation stage, which ensures that each socket controller 28 and 29 is correctly configured with regard to each link 26. During this stage of training, each device 22 and 23 sends a known packet of data repeatedly down a link 26 until the other device 23 and 22 adjusts the parameters of its receiver to the point where it is able to read the data correctly. This process is repeated for each link 26 in each direction upon initial connection, which ensures that every link 26 is capable of being used in both directions.

At Step 34, initial link training begins. This also involves sending packets of known configuration data down a link 26 in a single direction and allows each socket controller 28 and 29 to get a bit and symbol lock for each link 26, dictating the initial direction of data flow, which is set at Step 35. The number of links 26 transmitting data in each direction could be equal in the first instance, or could be entirely in one direction or the other, or could be balanced in any other way according to stored heuristics or negotiation between the devices 22 and 23.

For example, in this embodiment four links 26 are available. The peripheral device 23 might send a signal to the host device 22 when the connection is first being negotiated, using the dedicated signal link 27, that it requires a minimum of one link 26 in the first instance. The host device 22 could then configure one link 26 to transmit data from the peripheral device 23 to the host device 22 during initial link training, while configuring the other three links 26 to transmit data from the host device 22 to the peripheral device 23.

At Step 36, data transmission begins, in the directions and using the links 26 configured during training. This will continue until interrupted by disconnection of the cable 21 or a requirement to change the direction of one or more links 26, though individual links 26 may temporarily become idle if there is not sufficient data being transmitted in a given direction to occupy all available links 26.

Thus, at Step 37, the peripheral device 23 might require an additional link, for example because it is receiving user input. The peripheral device 23 determines (step 316) whether there is a link 26 not currently in use. If so, the peripheral device 23 will immediately begin link training in order to use that link 26 (Step 312). If there is no idle link available, the peripheral device 23 uses the dedicated signal wire 27 to send a signal to the host device 22 (the co-ordinating device) requesting use of a link 26 (Step 38).

When it receives the signal from the peripheral device 23, the host device 22 automatically slows the rate of data production, increases data compression or performs any other method of reducing the volume of data transmission (Step 39). The host device 22 then selects a link 26 for transfer to be used by the peripheral device 23 and stops sending data through it. The link 26 then becomes idle (Step 310).

Selection of the lane 26 whose data flow direction is to be changed may be according to a heuristic such as:
  the most recent lane to fetch data for transmission is selected;
  the least recent lane to fetch data for transmission is selected;
  the lanes are assigned an order and the first lane in this order that is currently transmitting data in the appropriate direction is selected;
  or another suitable heuristic according to the circumstances of the connection. The host device 22 may also be responsible for determining the number of links 26 to be assigned to the peripheral device 23 with reference to a preferred and minimum numbers of lanes 26 requested, which may also be used when selecting the link 26.

The peripheral device 23 is aware that it is no longer receiving data through a particular link 26 and therefore that the link 26 has been freed (Step 311). The peripheral device 23 then begins link training by sending a wakeup signal down the newly idle link 26 (Step 312). Only the link training part of training needs to be repeated at Step 313, since all the links were initially trained to perform bi-directionally, and only with respect to the link 26 whose direction is being changed, so this stage is faster than the initial training stage.

The link training stage will be the same as the previously-described initial link training stage at Step 34 and involve the peripheral device 23 sending packets of known configuration data down the newly idle link 26, reconfiguring the socket controller on the host 28 in the same way as initial configuration. This, combined with any signal sent at Step 38, comprises a reconfiguration signal. Of course, if the host device 22 requires a link currently being used by the peripheral device 23, it may send a similar reconfiguration signal to the peripheral device 23, as described hereinafter.

At Step 314, the peripheral device 23 is then able to transmit data down the reallocated link 26. It sends a signal to the host device 22 using either the dedicated slow signal wire 27 or the newly-reallocated link 26 to confirm that the direction of the link 26 has changed and warn the host device to expect to receive data through that link 26, and it then begins transmitting data at Step 315.

In an alternative mode of operation using the same embodiment, the host device 22 and peripheral device 23 are connected and the cable 21 is configured according to Steps 31-35 as described above, with equal numbers of links 26 carrying data in each direction. For example, the host device 22 may be a laptop computer and the peripheral device 23 may be an external hard disk. In this embodiment, a user, may be sending data to the peripheral device 23 as in the case of an external display, but also reading data from the peripheral device 23 for use on the host device 22.

If the host device 22 requires the use of an additional link 26, it checks the links 26 that it is currently using and those from which it is currently receiving data in order to see if any are currently idle. If so, as aforementioned at Step 312, it begins link training in order to use that link 26. Otherwise, as the co-ordinating device, it will select a link to reallocate, possibly using a similar heuristic to those described above, and uses the dedicated signal wire 27 to send a signal to the peripheral device 23 telling it to stop using that link 26. The peripheral device 23 will adjust its rate of data transmission as aforementioned at Step 39 and stop transmitting data down the requested link 26. The host device 22 is aware that it is no longer receiving data from that link 26 and that it has become idle. It therefore begins link training as aforementioned at Step 312. When this is complete, it will signal to the peripheral device 23 that the direction of the link 26 has changed, and it will begin transmitting data.

Figure 4:
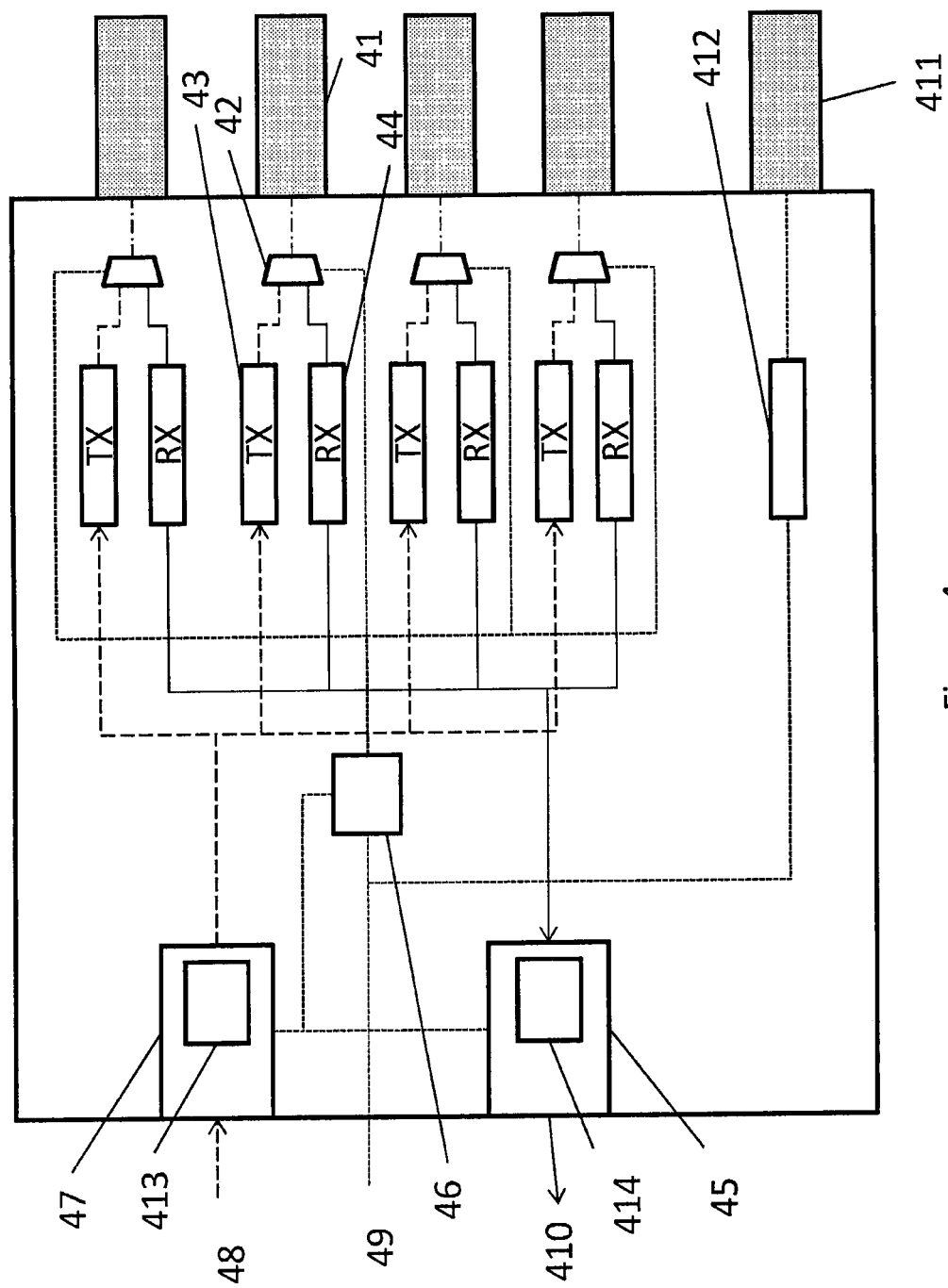
FIG. 4 is a more detailed schematic of an example hardware embodiment of a device used in the system of FIG. 2.

FIG. 4 shows a more detailed example hardware embodiment of a socket controller 28, 29 such as those shown in FIG. 2. As shown in FIG. 2, these socket controllers 28, 29 are within the host device 22 and the peripheral device 23. This example shows the socket controller 28 in the host device 22, although they may be identical. The socket controller is likely to include components other than those shown here, but they are not shown for the sake of clarity. Furthermore, only one set of components for one link is labelled with reference numerals, although all the others are shown as being identical.

The socket controller has a number of connectors 41 which connect to corresponding complementary connectors in the plug of a cable as described in FIGS. 2 and 3. Each connector 41 is connected to a switch 42 which either delivers data from a transmitter 43 or directs incoming data to a receiver 44. The behaviour of the switch 42 is controlled by a controller 46 via a control line (shown as a dotted line) to switch between receiving behaviour and transmitting behaviour according to instructions received from the controller 46. The controller 46 in turn receives instructions via a communication line 49 from a main processor on the host device. This may be a conventional processor and is not here shown.

During training as aforementioned, each transmitter 43 associated with each link will be responsible for sending configuration packets and its corresponding receiver 44 at the other end of the connection will be responsible for changing its parameters until it can read them.

In an alternative embodiment, the controller 46 could be a more powerful processor with the capability to make switching decisions itself. In this case, it would receive signals from a signalling engine 412 coupled to the slow signal line over connector 411 directly rather than these being passed back to the main host processor. However, it would still communicate via the communication line 49 with the main processor in order to relay signals that would prompt the main processor to alter the volume of data being supplied by, for example, increasing or decreasing compression.

Data is supplied to the socket controller through a data input line 48 into an input engine 47 which contains an input buffer 413 to hold data input from the main processor until it is fetched by a transmitter 43 along the appropriate output line (shown as a dashed line). The transmitters 43 are aware of whether they are currently connected to their respective connectors 41 by the switches 42 and will not fetch data unless they can output it.

The receivers 44 are connected to an output engine 45 which contains an output buffer 414 in which data is stored prior to being fetched by the main processor of the host down a data line 410. When data is received by a receiver 44, it is immediately sent to the output engine 45 along the appropriate output line (shown as a solid line).

Both the input engine 47 and the output engine 45 have signalling connections with the controller 46. These enable them to tell the controller 46 when their respective buffers 413, 414 are approaching a level where overflow may be a concern. Such signals could prompt the controller 46 to:

send a signal to the main host processor telling it to reduce the volume of data produced;

send a signal to the connected device telling it to reduce the volume of data produced;

send a signal to the main host processor requesting further links to be made available for output (this would then prompt the host to behave as described in FIG. 3);

in an embodiment where the controller 46 is capable of making such requests, send the appropriate signals to change the direction of a link without the involvement of the main host processor;

as appropriate. These possibilities may be applied in combination and/or alongside other signals and behaviours depending on the exact circumstances and embodiment.

Where signals are to be sent to the connected device, this is done through the signalling engine 412, which is connected to the signalling connector 411 which in turn is connected to the dedicated slow signal link (see FIG. 2). In this embodiment, the signalling engine 412 receives signals from the main host processor which it then passes on to the connected device as appropriate: for example, instructions to, stop transmitting down a certain lane so that it can be converted to carry data in the other direction, or to slow the rate of data production because the host device is unable to process it quickly enough.

Naturally, although the socket controller shown in FIG. 4 is described as being on the host device 22, the corresponding socket controller on the peripheral device 23 may be identical. This means that the signalling engine 412 will receive signals from a processor on the peripheral device 23 and transmit these to the host device 22 in order to prompt reconfiguration of one or more lanes as described in FIG. 3, in the same way as described above for the signalling engine 412 on the host device 22. Likewise, the controller 46 will be in communication with the processor on the peripheral device 23 and will control the switches accordingly to dictate transmit and receive behaviour.

Although only one particular embodiment has been described in detail above, it will be appreciated that various changes, modifications and improvements can be made by a person skilled in the art without departing from the scope of the present invention as defined in the claims. For example, hardware aspects may be implemented as software where appropriate and vice versa. Furthermore, it will be appreciated that although the only four high-speed links have been described, the invention may be implemented with any number of data links, whether high speed or not. Also, although the controllers have been described as being in the devices in order to allow use of standard cables, if desired, in some circumstances, the controllers and other elements of the socket controllers may be incorporated into the plugs at each end of the cable itself, allowing it to be more "intelligent" with respect to the use it makes of the bandwidth available in its links by monitoring the data flow on the links, and may therefore be capable of carrying out the reallocation of links, without requiring instructions from a co-ordinating device, although it would still need to train the transmitting and receiving components in the sockets of each device.

Although illustrative embodiments have been shown and described, a wide range of modification, change and substitution is contemplated in the foregoing disclosure and, in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of configuring a Universal Serial Bus, USB, connection between a host device and a peripheral device, the USB connection comprising at least two high speed data channels and at least one low speed data channel, the at least two high speed channels comprising at least four super-speed links and the at least one low speed data channel comprising a pair of signal links, each of the at least four super-speed links and the pair of signal links comprising a port in the host device and the peripheral device at both ends of the USB connection, and a signal wire extending between corresponding ports, each signal wire comprising one or more physical wires, wherein the at least four super-speed links are configured to be capable of transmitting data bidirectionally, the method comprising:
   initially determining a first direction for transmission of data for each of the bidirectionally configured super-speed links based on an initial required data transmission capacity in each direction between the host device and the peripheral device;
   transmitting data along each of the bidirectionally configured super-speed links in the determined first direction;
   receiving, by the host device, a request signal from the peripheral device requesting a particular data transmission capacity in a particular direction;
   selecting, by the host device, which super-speed link of the at least four bidirectionally configured super-speed links that is transmitting data in the first direction should change its direction of transmission to a second direction, based on the requested particular data transmission capacity;
   sending, by the host device, a redirection signal to the selected bidirectionally configured super-speed link to cause the selected bidirectionally configured super-speed link to change its direction of transmission of data to the second direction; and
   transmitting data along the selected bidirectionally configured super-speed link in the second direction.

2. The method of claim 1, wherein the first direction initially determined for each of the bidirectionally configured super-speed links is the same, with one of the signal links of the slow speed data channel being used in the second direction.

3. The method of claim 1, wherein the request signal includes a request for a preferred number of signal links to be used for data transmission in the particular direction.

4. The method of claim 1, wherein the request signal includes a request for a minimum number of signal links to be used for data transmission in the particular direction.

5. A system comprising:
   a host device having a plurality of ports connected to a host controller;
   a peripheral device having a plurality of ports; and
   a Universal Serial Bus, USB, cable between the host device and the peripheral device,
   the system providing a USB connection comprising at least two high speed data channels and at least one low speed data channel, the at least two high speed channels comprising at least four super-speed links and the at least one low speed data channel comprising a pair of signal links, each of the at least four super-speed links and the pair of signal links comprising a port in the host device, a port at the peripheral device, and a signal wire extending between corresponding ports, each signal wire comprising one or more physical wires, wherein the at least four super-speed links are configured to be capable of transmitting data bidirectionally, wherein the USB connection is configured by:
   initially determining a first direction for transmission of data for each of the bidirectionally configured super-speed links based on an initial required data transmission capacity in each direction between the host device and the peripheral device;
   transmitting data along each of the bidirectionally configured super-speed links in the determined first direction;
   receiving, by the host device, a request signal from the peripheral device requesting a particular data transmission capacity in a particular direction;
   selecting, by the host device, which super-speed link of the at least four bidirectionally configured super-speed links that is transmitting data in the first direction should change its direction of transmission to a second direction, based on the requested particular data transmission capacity;
   sending, by the host device, a redirection signal to the selected bidirectionally configured super-speed link to cause the selected bidirectionally configured super-speed link to change its direction of transmission of data to the second direction; and
   transmitting data along the selected bidirectionally configured super-speed link in the second direction.

6. The system of claim 5, wherein the first direction initially determined for each of the bidirectionally configured super-speed links is the same, with one of the signal links of the slow speed data channel being used in the second direction.

7. The system of claim 5, wherein the request signal includes a request for a preferred number of signal links to be used for data transmission in the particular direction, or wherein the request signal includes a request for a minimum number of signal links to be used for data transmission in the particular direction.

8. A method of configuring a Universal Serial Bus, USB, connection between a host device and a peripheral device, the USB connection comprising at least two high speed data channels and at least one low speed data channel, the at least two high speed channels comprising at least four super-speed links and the at least one low speed data channel comprising a pair of signal links, each of the at least four super-speed links and the pair of signal links comprising a port in the host device and the peripheral device at both ends of the USB connection, and a signal wire extending between corresponding ports, each signal wire comprising one or more physical wires, wherein the at least four super-speed links are configured to be capable of transmitting data bidirectionally, the method comprising:

- initially determining a first direction for transmission of data for each of the bidirectionally configured super-speed links based on an initial required data transmission capacity in each direction between the host device and the peripheral device;
- transmitting data along each of the bidirectionally configured super-speed links in the determined first direction;
- selecting, by the host device, which super-speed link of the at least four bidirectionally configured super-speed links that is transmitting data in the first direction should change their direction of transmission to a second direction, wherein selecting which super-speed link of the at least four bidirectionally configured super-speed links that is transmitting data in the first direction should change its direction of transmission to the second direction is based on a priority of the data to be transmitted over the selected bidirectionally configured super-speed link and data to be transmitted over non-selected bidirectionally configured super-speed links;
- sending, by the host device, a redirection signal to the selected bidirectionally configured super-speed link to cause the selected bidirectionally configured super-speed link to change its direction of transmission of data to the second direction; and
- transmitting data along the selected bidirectionally configured super-speed link in the second direction.

9. The method of claim 8, wherein the priorities of the data to be transmitted over the selected bidirectionally configured super-speed link and the data to be transmitted over non-selected bidirectionally configured super-speed links depend on priorities of processes using the data.

10. The method of claim 9, wherein the priorities of the processes are maintained in a look-up table.

11. The method of claim 8, wherein the first direction initially determined for each of the bidirectionally configured super-speed links is the same, with one of the signal links of the slow speed data channel being used in the second direction.

12. A system comprising:
- a host device having a plurality of ports connected to a host controller;
- a peripheral device having a plurality of ports; and
- a Universal Serial Bus, USB, cable between the host device and the peripheral device,
- the system providing a USB connection comprising at least two high speed data channels and at least one low speed data channel, the at least two high speed channels comprising at least four super-speed links and the at least one low speed data channel comprising a pair of signal links, each of the at least four super-speed links and the pair of signal links comprising a port in the host device, a port at the peripheral device and a signal wire extending between corresponding ports, each signal wire comprising one or more physical wires, wherein the at least four super-speed links are configured to be capable of transmitting data bidirectionally, wherein the USB connection is configured by:
  - initially determining a first direction for transmission of data for each of the bidirectionally configured super-speed links based on an initial required data transmission capacity in each direction between the host device and the peripheral device;
  - transmitting data along each of the bidirectionally configured super-speed links in the determined first direction;
  - selecting, by the host device, which super-speed link of the at least four bidirectionally configured super-speed links that is transmitting data in the first direction should change their direction of transmission to a second direction, wherein selecting which super-speed link of the at least four bidirectionally configured super-speed links that is transmitting data in the first direction should change its direction of transmission to the second direction is based on a priority of the data to be transmitted over the selected bidirectionally configured super-speed link and data to be transmitted over non-selected bidirectionally configured super-speed links;
  - sending, by the host device, a redirection signal to the selected bidirectionally configured super-speed link to cause the selected bidirectionally configured super-speed link to change its direction of transmission of data to the second direction; and
  - transmitting data along the selected bidirectionally configured super-speed link in the second direction.

13. The system of claim 12, wherein the priorities of the data to be transmitted over the selected bidirectionally configured super-speed link and the data to be transmitted over non-selected bidirectionally configured super-speed links depend on priorities of processes using the data.

14. The system of claim 12, wherein the first direction initially determined for each of the bidirectionally configured super-speed links is the same, with one of the signal links of the slow speed data channel being used in the second direction.

* * * * *